Feb. 3, 1931. J. C. KENNEDY 1,791,449
AUTOMATIC PUMP DISCHARGE VALVE
Filed Oct. 8, 1928
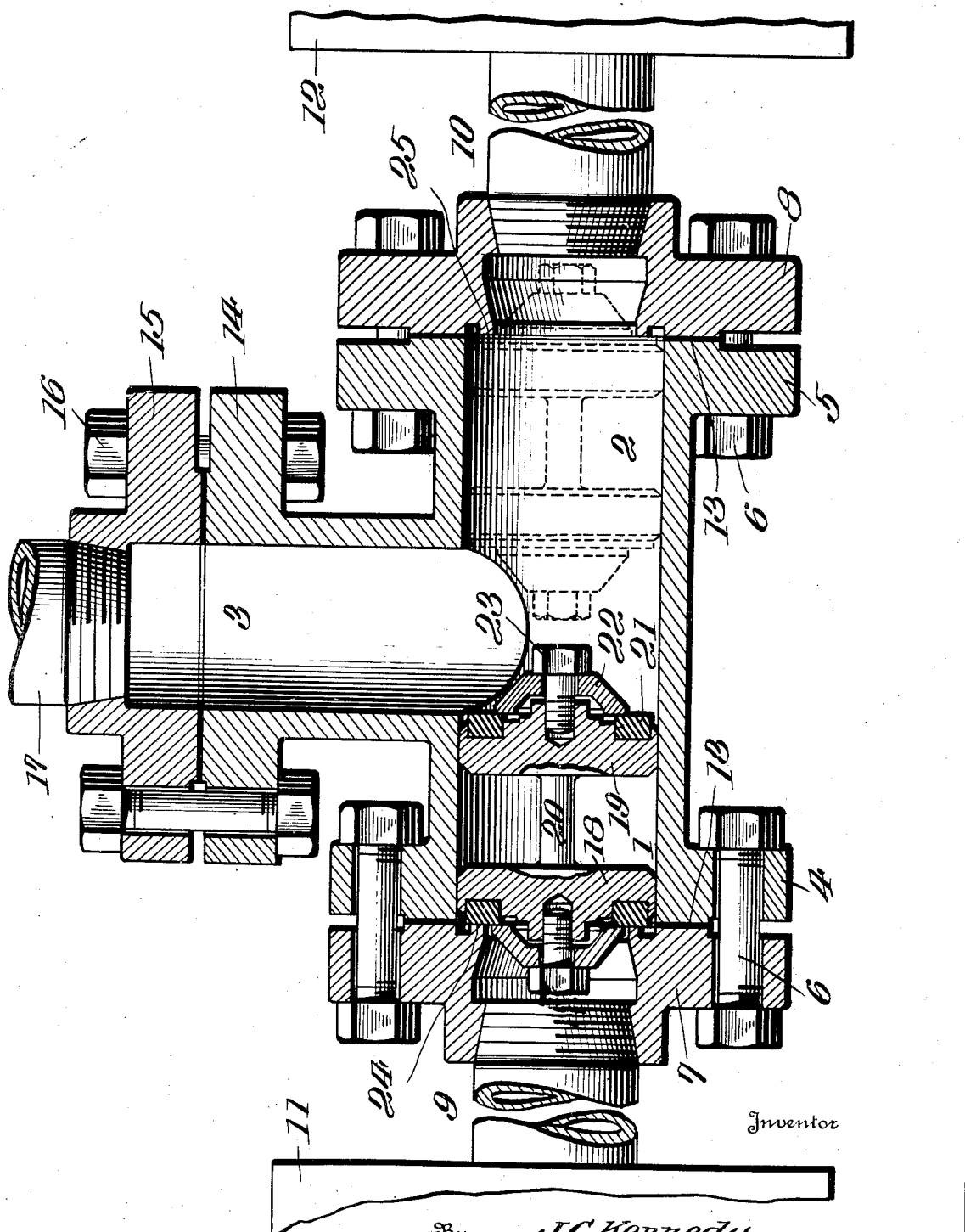
Inventor
By J. C. Kennedy.
Attorney Patented Feb. 3, 1931

1,791,449

UNITED STATES PATENT OFFICE

JOHN C. KENNEDY, OF ELMIRA, NEW YORK, ASSIGNOR TO THE KENNEDY VALVE MFG. CO., OF ELMIRA, NEW YORK, A CORPORATION OF NEW YORK

AUTOMATIC PUMP-DISCHARGE VALVE

Application filed October 8, 1928. Serial No. 311,171.

This invention relates to certain new and useful improvements in an automatic pump-discharge valve especially adapted to be used for controlling two rotary slush pumps connected to a common discharge line, one pump being in operation at a time, the object being to simplify the construction and to provide a valve which is automatically moved by the pressure to close one of the inlets when the pump connected to said inlet is out of operation.

Another and further object of the invention is to provide a valve which can be manufactured very cheaply, the parts being so arranged and mounted that they can be readily assembled or taken apart.

Other and further objects and advantages of the invention will be hereinafter set forth and the novel features thereof defined in the appended claim.

In the drawing I have shown a vertical section of my improved construction of automatic pump discharge valve comprising an inverted T-shaped body having oppositely disposed inlets 1 and 2 and a vertically disposed outlet 3. The ends of the inlets are surrounded by annular flanges 4 and 5 to which are connected by bolts 6 coupling members 7 and 8 provided with threaded bosses in which are screwed pipes 9 and 10 leading from rotary pumps 11 and 12. Suitable packing 13 is disposed between the abutting faces of the flanges and the coupling members in order to form a liquid tight joint.

The outlet 3 is provided with an annular apertured flange 14 to which is connected a coupling member 15 by bolts 16 which is also provided with a threaded boss in which is secured an outlet pipe 17.

Slidably mounted within the horizontally disposed portion of the body is a valve member comprising a pair of heads 18 and 19 connected together by a stem 20 to form an annular water chamber in which the fluid collects to lubricate the valve in its sliding movements. The outer faces of said heads are provided with annular grooves to form seats for discs 21 which are secured in position by spider shaped disc retainers 22 secured to the heads by bolts 23.

The valve thus formed is free to slide back and forth so as to close either of the inlets. The coupling members 7 and 8 are provided with annular grooves forming valve seats 24 and 25 on which the discs 21 are adapted to seat so as to completely close either of the inlets.

By constructing a valve in this manner and connecting the same up to two rotary or reciprocating pumps, the valve is automatic in operation so that when one pump is in use, the inlet to said body is closed which communicates with the other pump or vice versa, whereby the use of manually controlled valves are eliminated and a construction is provided to overcome the difficulty now existing in the operator becoming confused and closing off the wrong manually operated valve, which in many cases destroys the pump.

In the operation of my valve when connected to a pair of pumps, when the pump 12 is in operation, the pressure of the fluid forces the valve over into the position shown in full lines so as to close the other inlet. When the pump 12 is cut off for repairing the same or for any other reason and the pump 11 is operated, the valve member is moved by the pressure of the incoming fluid from pump 11 into the position shown in dotted lines so as to close the inlet 2, whereby either one of the pumps can be placed in operation or out of operation and a common outlet is provided for a pair of pumps so that all danger of the outlet of one of the pumps being accidentally closed when in operation is prevented.

What I claim is:—

A valve of the kind described comprising an inverted T-shaped body having a cylindrical chamber provided with oppositely disposed inlets and a common outlet, coupling members carried by the inlets of said body annularly grooved to form annular valve seats, a double headed valve connected together by a stem to form an annular water chamber mounted in said body, the outer faces of said heads being provided with annular grooves to form seats, circular discs arranged within said seats adapted to cooperate with the annular seats of said coupling member, spider shaped disc retainers, bolts securing said retainers to said heads, said valve being slidably mounted in said cylindrical chamber and adapted to close either of said inlets and allow the other to remain open.

In testimony whereof I hereunto affix my signature.

JOHN C. KENNEDY.